United States Patent [19]

Neuwirth

[11] Patent Number: 4,899,376
[45] Date of Patent: Feb. 6, 1990

[54] IDENTIFICATION STRIP AND HOLDER FOR TELEPHONE CONNECTOR BLOCKS

[75] Inventor: Helmuth Neuwirth, Garden City, N.Y.

[73] Assignee: Porta Systems Corp., Syosset, N.Y.

[21] Appl. No.: 343,679

[22] Filed: Apr. 27, 1989

[51] Int. Cl.$^4$ .............................................. H04Q 1/02
[52] U.S. Cl. ...................................... 379/327; 40/649
[58] Field of Search ................ 379/327, 330, 331, 332; 40/649, 650, 651, 652, 653, 654, 642

[56] References Cited

U.S. PATENT DOCUMENTS 4,371,756 2/1983 Fasano ................................. 379/177
4,813,071 3/1989 De Luca ............................. 379/327

Primary Examiner—James L. Dwyer
Attorney, Agent, or Firm—Charles E. Temko

[57] ABSTRACT

An improved subscriber circuit identification construction for use directly upon telephone connector blocks having detachable block engaging device selectively positioning the identifying indicia in one of plural locations relative to an exposed surface of the block. The construction includes an elongated holder element having resilient projections arranged in parallel rows and selectively engaging corresponding bores extending from the surface of the connector block, the holder element retaining a replaceable indicia bearing strip. Depending upon the selected location, the holder element is positioned laterally of identified contacts on the block so as to allow ready access to them, or the holder element is positioned to overlie said contacts to provide a protective cover function.

6 Claims, 2 Drawing Sheets

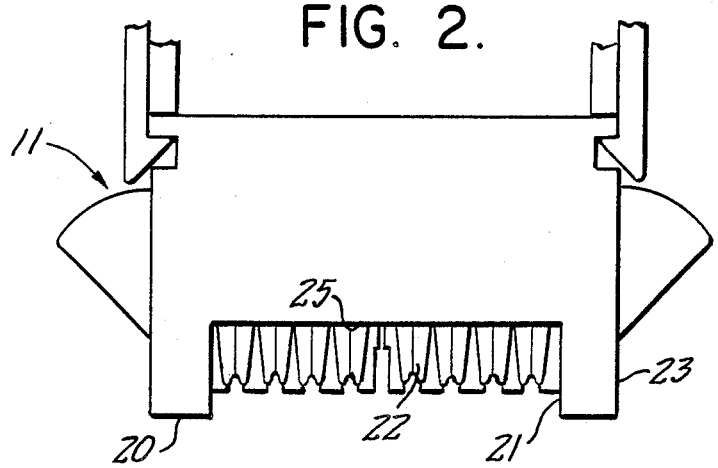
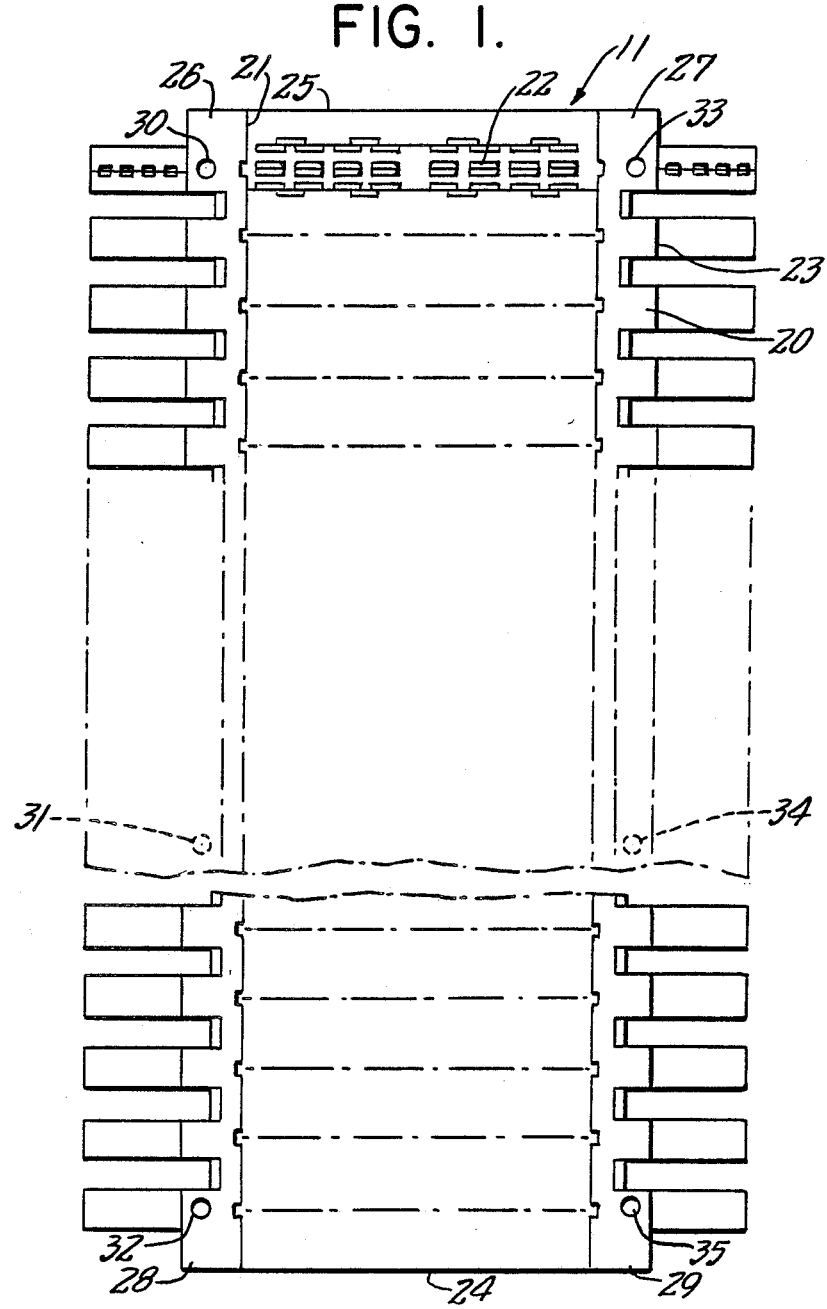

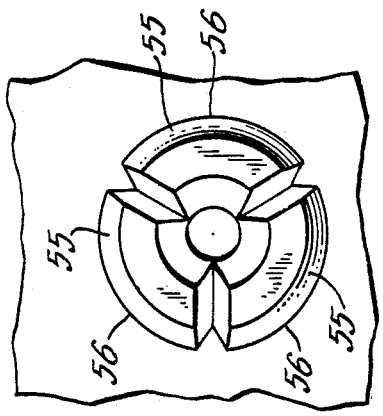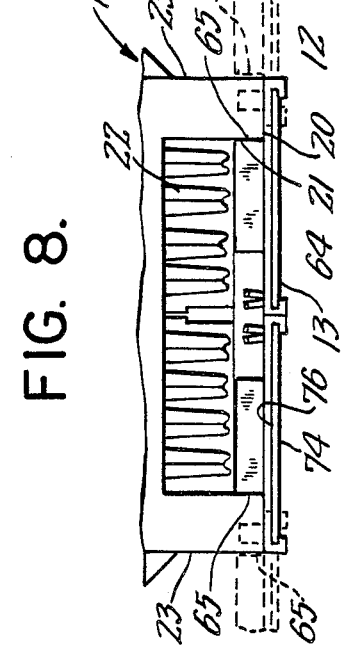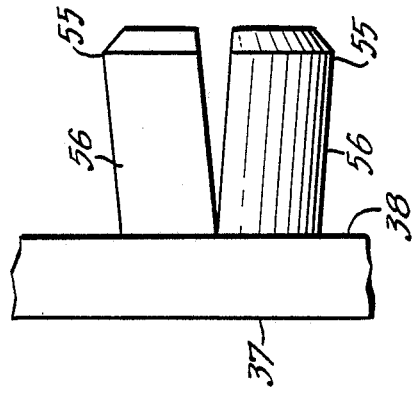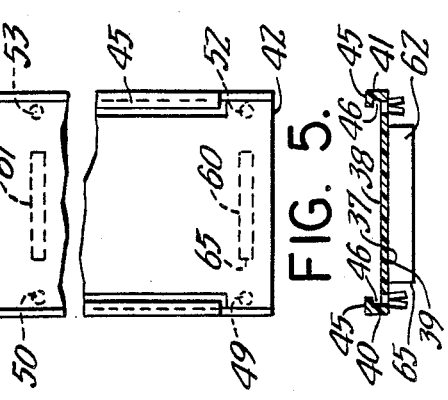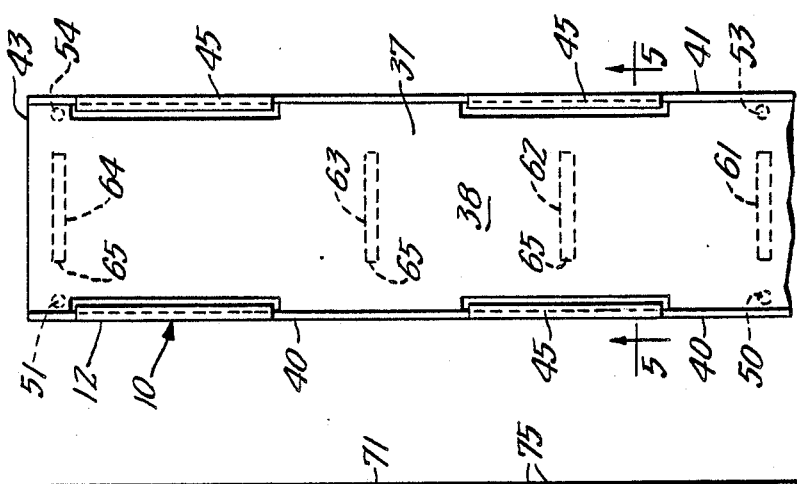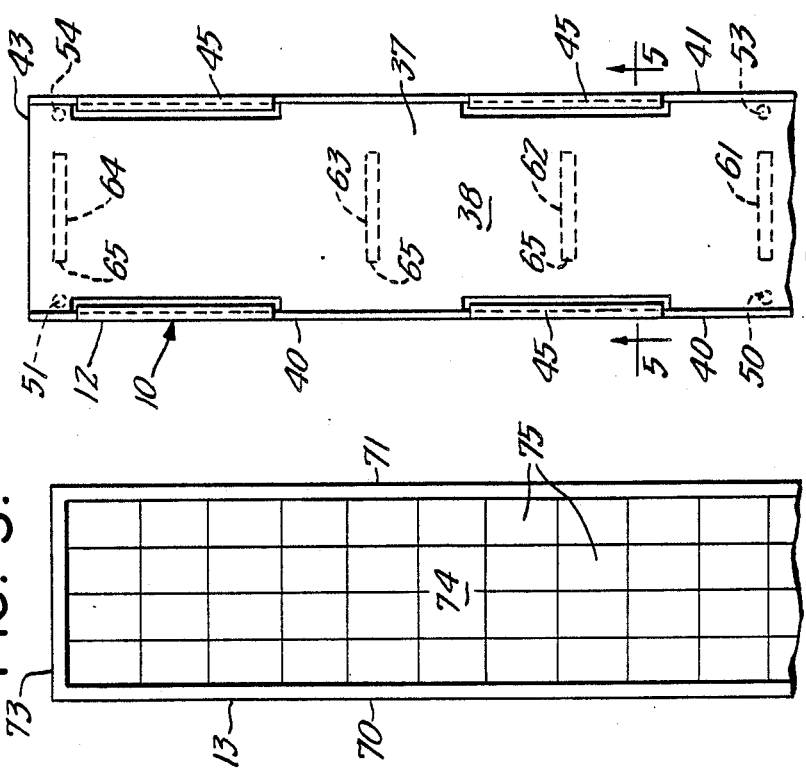

IDENTIFICATION STRIP AND HOLDER FOR TELEPHONE CONNECTOR BLOCKS

BACKGROUND OF THE INVENTION

This invention relates generally to the field of telephony, and more particularly to an improved circuit identification strip construction which is detachably associated with an exposed surface of a telephone connector block in such location as to facilitate the identification of contacts on the block with individual subscriber circuits.

It is known in the art to provide adhesively backed paper strips for this purpose, the exposed surface of which may be written upon and erased for the reception of updated legends. Such strips may be periodically removed and replaced with fresh strips. It is also known to provide connector blocks of synthetic resinous materials which have exposed surfaces having a matte finish for the retention of handwritten legends for the same purpose. Such structures have a number of disadvantages in use, including often awkwardly located fixed locations, the inability to relatively change notations when required, and, in the case of paper strips, the deterioration of the strip with passage of time.

SUMMARY OF THE INVENTION

Briefly stated, the invention contemplates the provision of a novel identification strip and holder therefor in which the above-mentioned disadvantages have been substantially eliminated. To this end, the disclosed embodiment includes an elongated marker strip of matte finished synthetic resinous material, optionally having a pressure-sensitive adhesive backing, and which may be readily erased and redesignated as required. The strip is not attached directly to the connector block, but is supported by a semi-rigid holding element having an outer surface having clip means for retaining the strip, and an inner surface provided with rows of resilient studs which are selectively engageable with corresponding rows of bores in exposed surfaces of the connector block. In one relative position, the strip is positioned laterally of the exposed contacts of the block, and in another selective position, the strip overlies the exposed contacts on the block to provide a protective function.

BRIEF DESCRIPTION OF THE DRAWINGS

In the drawings, to which reference will be made in the specification, similar reference characters have been employed to designate corresponding parts throughout the several views.

FIG. 1 is a front elevational view of a connector block forming a part of the disclosed embodiment.

FIG. 2 is a top plan view of the connector block of FIG. 1.

FIG. 3 is a front elevational view of an identification strip forming another part of the invention.

FIG. 4 is a rear elevational view of the identification strip supporting element.

FIG. 5 is a view in section of an identification strip supporting element takin on the line 5—5 of FIG. 4.

FIG. 6 is an enlarged fragmentary side elevation showing a resilient stud.

FIG. 7 is an end view of the resilient stud of FIG. 6.

FIG. 8 is a view in elevation showing one position of engagement of the structure shown in FIG. 4 with the structure shown in FIG. 1, and, in broken line, an alternative engaged position.

DETAILED DESCRIPTION OF THE DISCLOSED EMBODIMENT

In accordance with the invention, the device, generally indicated by reference character 10, is used in conjunction with a known telephone connector block 11 (See FIG. 1), and comprises broadly an identification strip holder element 12 and a circuit identification strip element 13.

The block element 11 is of a type rather widely used at the present time in the telephone industry, and is of generally rectangular shape. It is partially bounded by a forwardly facing surface 20 defining a rectangular recess 21 in which are disposed plural insulation displacement contacts 22 arranged in rank and file. The block is bounded by side wall surfaces, one of which is indicated by reference character 23, a bottom wall surface 24, and the recess 21 may include an opened top edge 25. Commencing at four corner areas 26, 27, 28 and 29, are vertical rows of inwardly directed bores 30, 31, 32, 33, 34, and 35.

The strip holder element 12 is preferably formed as a molding from suitable synthetic resinous materials such as polycarbonate or the like. It includes an elongated main body 37 defining an upper surface 38, a lower surface 39, side edges 40 and 41 as well as end edges 42 and 43. The upper surface 38 is provided with channel-forming members 45 which define a pair of elongated parallel grooves 46 for the reception of the element 13.

The lower surface 39 mounts a pair of rows of resilient studs or projections 49, 50, 51, 52, 53 and 54, which are positioned so as to selectively engage the bores 30–35. Each of the studs is formed to include a plurality of arcuately shaped resilient fingers 55 (See FIG. 6), the outer surfaces 56 in compressed condition frictionally engaging the inner surfaces of the bores 30–35. Located between the studs 49–54 are small rectangular projections 60, 61, 62, 63 and 64, each of which defines end surfaces 65 which are adapted to contact the surfaces of the side walls 23, or, alternatively, the surfaces of the recess 21, depending on which row of the studs 49–54 are engaged with a row of bores 30–35 in the block 11.

The strip element 13 may be cut from sheet synthetic resinous material, preferably polyvinylchloride, approximately 0.01 inches thick. It is of elongated rectangular configuration corresponding to that of the element 12, and is bounded by side edges 70 and 71, and end edges 72 and 73. An upper surface 74 thereof is provided with printed rectangular areas 75 for the insertion of identification data. A lower surface 76 may be provided with an optional self-adhesive backing (not shown).

The element 13 is positioned beneath the channel-forming members 45 of the element 12 during assembly, and may be replaced as often as required.

Depending upon the character of the installation of the block 11 upon a telephone main frame (not shown), it may be desirable to employ the device 10 in such manner that the contacts 22 are covered or shielded during normal operation. This is accomplished by positioning the device as shown in FIG. 7, in which case the rectangular projections 60–64 will engage a surface of the recess 21 to provide stability. In other cases, or when the block is being serviced by a craftsperson, it may be desirable to relocate the device 10 to the position shown in FIG. 8, wherein the identification function is present, but the contacts 22 are accessible. Normally, the block 11 will mount a pair of devices 10, so that in overlying relation, all of the contacts 22 are shielded in this manner.

I wish it to be understood that I do not consider the invention to be limited to the precise details of structure shown and set forth in this specification, for obvious modifications will occur to those skilled in the art to which the invention pertains.

I claim:

1. An improved identification marker device for use with a telephone connector block having cooperative engaging means on an exposed surface thereof for the selective reception of said marker device comprising: An elongated main body having first and second opposed planar surfaces, said first surface having retention means thereon for selectively engaging an indicia bearing member; said second surface having a plurality of laterally extending projections in mutually spaced rows thereon selectively engaging said cooperative engaging means in one of plural relative positions.

2. An identification marker device in accordance with claim 1, further comprising: a planar indicia bearing member engaged with said first surface, said retention means including channel forming means thereon engaging corresponding side edges of said indicia bearing member.

3. An identification marker device in accordance with claim 1, further characterized in said cooperative engaging means comprising rows of bores extending inwardly from said exposed surface and selectively engaging said projections.

4. An identification marker device in accordance with claim 3, in which said projections are arranged in parallel rows, whereby different rows of said projections may be selectively engaged with a single row of bores in said connector block, to cause said marker device to be selectively positioned to at least partially overlie said exposed surface of said block, or be positioned substantially laterally thereof.

5. In combination: a telephone connector block having an exposed suface surrounding plural contacts thereon, said surface defining at least one row of bores extending inwardly from said exposed surface; an identification marker device including a generally planar main body having first and second surfaces, a first surface having plural rows of laterally extending projections thereon, each row of projection being selectively engaged with said row of bores in said block, said second surface having means for retention of indicia thereon; whereby said marker device is selectively positionable with respect to said exposed surface of said block to at least partially overlie the same, or be laterally displaced therefrom.

6. The combination set forth in claim 5, further comprising a circuit identifying strip element selectively engaged upon said second surface of said identification member device.

* * * * *